INVENTOR.
Henry Magnuski
BY
Mueller & Aichele
ATT'YS.

INVENTOR.
Henry Magnuski

BY Mueller & Aichele

ATT'YS.

United States Patent Office 3,361,970

Patented Jan. 2, 1968

3,361,970

SELECTION OF FREQUENCIES FOR MINIMUM DEPTH OF FADING IN A FREQUENCY DIVERSITY MICROWAVE LINE OF SIGHT RELAY LINK

Henry Magnuski, Glenview, Ill., assignor to Motorola, Inc., Franklin Park, Ill., a corporation of Illinois Filed Feb. 15, 1965, Ser. No. 432,697
2 Claims. (Cl. 325—56)

ABSTRACT OF THE DISCLOSURE

Frequencies related as the ratio of two immediately successively integers are selected as the frequencies for the carrier waves in a frequency diversity microwave line of sight relay system. Selection of frequencies having this relationship minimizes the depth of fading of the received signal.

Multipath propagation sometimes prevalent in microwave systems may produce deep fades or loss of signal strength in the receivers of the systems. These fades can occur rapidly, may repeat frequently and sometimes last as long as a few minutes. This loss of signal strength and possible complete interruption of transmission is damaging to the service, particularly when the system is used as a link between computing machines and apparatus situated in different cities. The invention is for the purpose of minimizing the depth of the fades or loss of signal strength, and for preventing total interruption of the transmission in such systems.

Multipath propagation as a cause of fading is an old and well known problem. Because of the differences in propagation characteristics of the medium through which the waves travel, they become broken up and parts thereof travel by paths having different lengths between the transmitter and the receiver. The different signal parts arrive at the receiver in different phase relation to each other and combine to produce a variable signal strength which may somewhat exceed that of the free space signal strength or may be very much less than free space signal strenth. If there are two signal parts of about equal strength, and the phase relation of these signal parts is one hundred and eighty degrees, the result can be a complete disappearance of the signal and interruption of the transmission.

In microwave relay systems, the electromagnetic energy travels through a space which is closely adjacent to the earth's surface and between antennas twenty to forty miles apart arranged in a line of sight. The atmosphere adjacent the earth's surface is less prone to thorough mixing and to turbulence than it is at the higher altitudes, at times it stagnates and stratifies. When this is accompanied by temperature inversion, the variation of the dielectric constant of the atmosphere with altitude becomes erratic producing fracture of the energy waves which are refracted and propagated over different paths towards the receiver antenna. When this multipath propagation prevails, then, over short distances of 20 to 40 miles, there is little opportunity for the wave to be broken into much more than two major parts, and at the same time be received at the receiver antenna. During the fading periods, the two dominant parts are often of approximately equal strength, and the variation of the path length difference is limited to less than 11 feet (according to some experimental data). Additional weak parts may travel over other parts, but they will not affect substantially the strength of the received signal.

To overcome the effects of the multipath propagation, the invention makes use of a frequency diversity system. In its application to microwave systems, the proper selection of the transmitting frequencies is quite important to produce the optimum results.

The principle of the present invention is based on an appreciation of the fact that in a microwave relay system, during fading periods there are two dominant paths most of the time, and it is possible to select the two frequencies transmitted so that they will produce an "anticorrelation" of fading between the signals at the two frequencies.

It is therefore an object of the present invention to provide an improved microwave relay communication link and/or system utilizing frequency diversity.

A further object is to provide a radio relay link or system wherein simultaneous transmissions are provided over channels of two different frequencies selected to produce "anticorrelation" of fading.

Another object is to provide a relay link with frequency diversity transmission wherein the two frequencies are selected so that the fading of the combined received signal is limited to a certain depth regardless of path length differences.

Still another object is to select the frequencies in a frequency diversity relay link or system so that the combined signal is practically free of fading, which means that it is about equal to or stronger than, the signal received during non-fading propagation periods.

Another object is to provide a relay system which includes a plurality of communication links each providing communication on at least two channels having a large frequency separation selected to prevent fading coincidence.

A feature of the invention is the selection of the frequencies in the microwave relay system so that a repetitive fading pattern is obtained as a function of path length difference, and the fading at the two frequencies will not coincide in such a pattern to produce "anticorrelation" of fading.

Still another feature is the selection of frequencies for the microwave relay so that their ratio is equal to the ratio of two immediately successive integers in order to obtain a repetitive fading pattern with properties as described above. By immediately successive integers is meant whole numbers which follow directly in order, such as 1 and 2, 2 and 3, 5 and 6, 20 and 21, etc.

A still further feature of this invention is the provision of a frequency diversity microwave relay system including one or more links between transmitting and receiving antennas, each providing for communication on two channels having a frequency separation which is the same as the lower of the two frequencies. This provides the shortest repetitive pattern with the combined signal practically free of fading.

The invention is illustrated in the drawings wherein.

Figure 1:
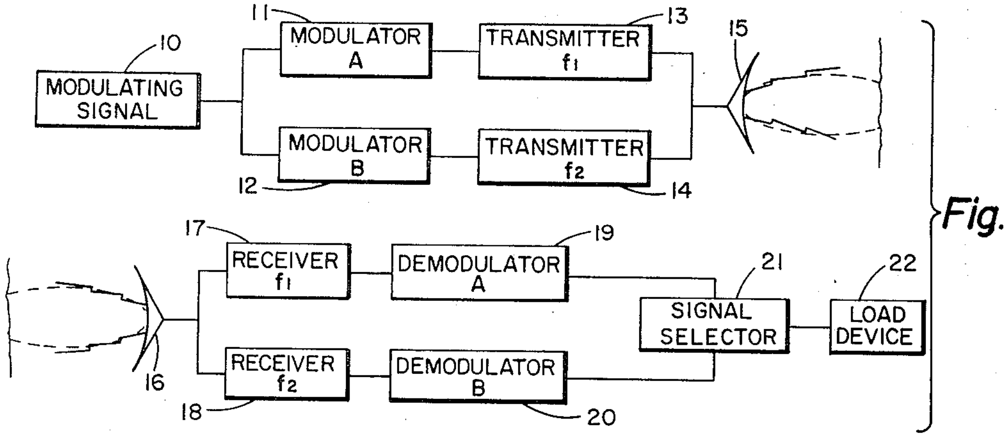
FIG. 1 is a block diagram of a frequency diversity system in accordance with the present invention.

FIG. 1 illustrates a system by which the invention may be carried out. A single modulating signal supply 10 is provided, and this may be of any kind, either a source to produce a signal as in the terminal station, or means deriving a signal from another link in a microwave relay system. The signal is fed to a pair of modulators 11 and 12 which in turn respectively modulate the carrier frequencies $f_1$ and $f_2$ of the transmitters 13 and 14. The outputs from the separate transmitters are fed to a single antenna 15 from which the microwave energy is radiated toward a receiving antenna 16, arranged on a line of sight path at a distant point.

Common antennas 15 and 16 for both frequencies should be used at both ends of the link to ascertain that both frequencies $f_1$ and $f_2$ follow the same path or paths through space. If separate antennas are used, they should be side by side and at the same height, and as close together as possible.

The signal received by the antenna 16 is fed to a pair of receivers 17 and 18 each tuned to one of the two frequencies. The signals are demodulated in the receiver or in separate means 19 and 20 and the outputs are fed to a signal selector or signal combiner 21. The signal selector operates to continually connect the output of the receiver or demodulator having the stronger signal to an output load device 22. The load device can be terminal equipment or it may serve as a modulating signal source for another link of the same system.

Figure 2:
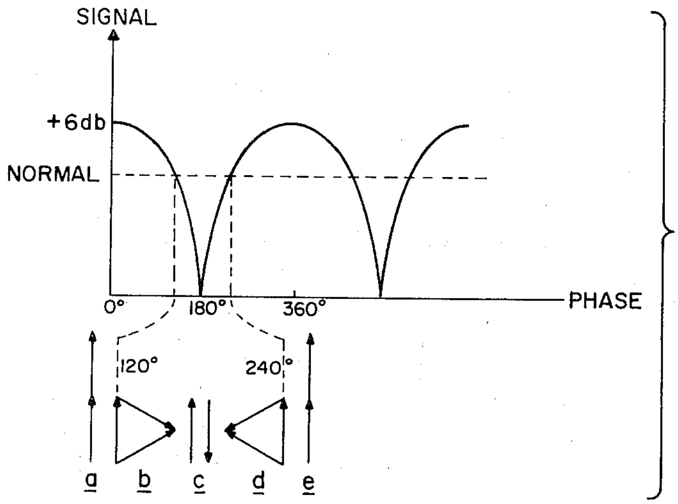
FIG. 2 is a curve and vector diagram illustrating the repetitive nature of the fading at one frequency with changes in the path length difference.

Energy arriving at the receiver antenna over two paths will differ in phase depending on the path length difference. Referring to FIG. 2, at the beginning of the fading period when a single path starts to separate into two paths, the paths are almost equal in length and there is no path length difference. The signals following the two paths under these conditions will be in phase at the receiver antenna as shown by the vector diagram *a* in FIG. 2 and the two signals will add up to approximately 2 times (6 db) stronger signal than that which would prevail had the propagation been by a single path. When the paths become further divided, their lengths begin to differ and the signals following the two separated paths arrive at the receiver antenna out of phase, as shown by the vector diagrams *b*, *c* and *d* in FIG. 2. As can be seen from the curve as the path length difference becomes greater, the phase difference of the two arriving signal portions will increase to further decrease the signal strength. When the signals in the two paths are again in phase, a strong signal is received as shown by diagram *e* in FIG. 2. Plotting the signal strength with the phase of arrival produces the indication of periodic fades occurring at half wave and odd multiples of half wave length difference in the path lengths. The fades are spaced exactly one wave length apart.

The fades become extreme when the signal portions are substantially equal in amplitude and the phases of arrival are one hundred and eighty degrees apart. The received signal will be above normal about ⅔ of the time but there will be frequent short and deep fades as the path length difference is increased. FIG. 2 is an idealized curve, and the path length difference actually experienced increases erratically and with no uniformity either in direction or rate of change. Also, this ideal two path propagation model, may be slightly altered by the presence of additional paths which are usually weak. However, propagation over two distinctive and about equally strong paths is most commonly observed.

Figure 3:
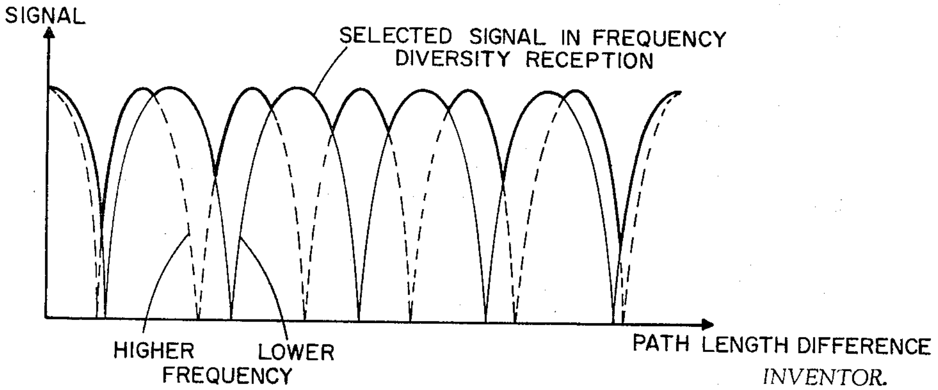
FIG. 3 illustrates the fading pattern using frequency diversity with a 5 to 6 frequency ratio.

For the purpose of the present invention, a frequency diversity system is used to eleminate deep fades and to substantially reduce all fading in the system. FIG. 3 illustrates how frequency diversity when used according to the present invention will serve the purpose of preventing a complete loss of signal and will produce a reduction in fading effects. As distinguished from space diversity reception wherein the reduction in fading effects is produced by a lack of fading correlation, in frequency diversity the fades are correlated at the two frequencies but are shifted in time. This can be controlled to provide an "anticorrelation" feature, which means that practically always if one signal fades, the other will have substantial strength, and deep fades will almost never coincide.

In FIG. 3, the curve shown in solid line represents the lower of the two frequencies whose ratio is 5 to 6, and the curve shown in dashed lines represents the higher of the two frequencies used in the frequency diversity system. As is exemplified in FIG. 3, the signals traversing the space between the transmitter and the receiver antennas and following the two paths will combine in the receiver to produce deep fades that occur at different times relative to each other. With the increase in the path length difference the wave with the shorter wave length (or higher frequency) will have the greatest frequency of fades and shortest distance between fades. Within the pattern shown on FIG. 3 representing the variation of path length difference of five wave lengths of the lower frequency wave, it can be seen that there will be no coincidence of fading by the two signals. This pattern will be repeated as the path length difference increases so that there will be no coincidence of the fading of the two signals even if the path length difference is very large.

If the frequencies in a frequency diversity system are selected so that their ratio can be expressed as a ratio of two immediately successive integers, for example 5 and 6 as shown in FIG. 3, then a repetitive pattern of fades will always be obtained and the fades will never exceed the discrete values shown, regardless of the path difference, assuming the receiver having the stronger signal is selected as shown by the heavy line on FIG. 3. To obtain the repetitive pattern for a given separation of frequencies of 5% for example, the ratio of frequencies should be either 19 to 20 or 20 to 21, and so on.

Figure 5:
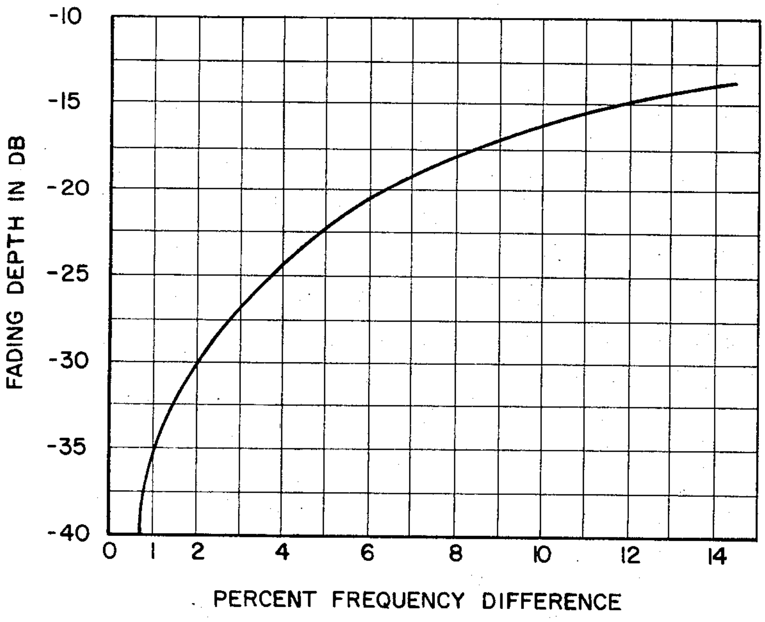
FIG. 5 is a curve which shows the fading depth at different frequency spacings in a frequency diversity system.

The expected preformance of a frequency diversity system is exemplified in FIG. 5, wherein the curve is plotted to show the maximum fading depth as a function of the percent frequency difference between the two frequencies used. This curve shows the deepest fade expected as a function of frequency separation in percent, provided the ratio of frequencies was selected properly, which means it was equal to the ratio of two immediately successive integers as previously described. There is thus a substantail improvement in the depth of the fades as the percent frequency difference increases. As shown in FIG. 5 the depth of fading increases as the ratio between the frequencies becomes smaller. Below a frequency ratio of 21:20 (about 5% on the curve of FIG. 5) the fading depth increases rapidly. It is, therefore, desirable to limit the frequency ratio to a ratio equal to or greater than 21:20.

Figure 4:
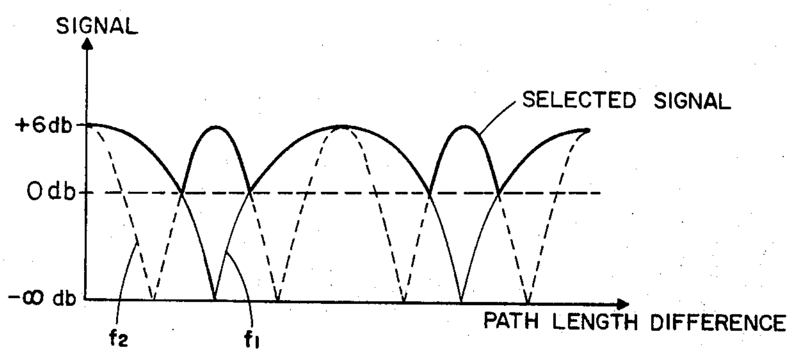
FIG. 4 is a curve illustrating the use of frequencies with a 2 to 1 ratio.

FIG. 4 is a curve, similar to that shown in FIG. 3, but representing a frequency diversity system wherein the ratio of frequencies used is 2 to 1, that is, where the frequency separation is equal to the frequency of the lower frequency used in the diversity system. In such a system, the same information is transmitted by the two frequencies, as in other diversity systems, but the frequencies are selected from separate bands. As an example, one frequency can be in the 6 kmc. band and the other in the 12 kmc. band. If the ratio of the frequencies is 2 to 1 (two smallest sequential integers) then a short repetitive fading pattern is obtained which in theory provides a signal that is equal to or larger than the free space signal (no fading). Such a system is practically free of all fading.

The frequencies $f_1$ and $f_2$ in the system of FIG. 1 are selected to produce the desired repetitive fading pattern, with $f_1$ and $f_2$ bearing the same relation as sequentially arranged integers. If the frequencies selected are of the ratio 2:1 (two lowest sequential integers) for maximum freedom from fading, then the transmitter arrangement as shown on FIG. 1 can be simplified. In such a system, only one modulator 11 and one transmitter 13 can be used, and the second harmonic of this transmitter can be suitably extracted and amplified before being applied to antenna 15.

A frequency diversity system as described wherein the ratio of frequencies is that of any pair of immediately successive integers, prevents coincidence in fading. The depth of fade decreases as the frequency separation increases. A two to one ratio of frequencies is preferable since it provides for maximum signal strength at all times during path length difference excursions and a total absence of interruption of transmission.

I claim:

1. A method of substantially reducing multipath fading in a microwave line of sight radio diversity system, including the steps of, producing a pair of carrier waves having frequencies related as the ratio of two immediately successive integers equal to or greater than 21:20, modulating said pair of carrier waves by a common modulating signal, simultaneously radiating said modulated carrier waves from common radiating means via a line of sight path to common receiving means, simultaneously receiving said carrier waves, demodulating said carrier waves to produce two outputs of said common modulating signal, and continuously selecting the stronger of said two outputs of said common modulating signal and feeding the same to a utilization device.

2. A method of substantially reducing multi-path fading in a microwave line of sight radio diversity system, including the steps of, producing a pair of carrier waves wherein the frequency of one carrier wave is twice the frequency of the other carrier wave, modulating said pair of carrier waves by a common modulating signal, simultaneously radiating said modulated carrier waves from a common radiating means via a line of sight path to common receiving means, simultaneously receiving said carrier waves, demodulating said carrier waves to produce two outputs of said common modulating signal, and continuously selecting the stronger of said two outputs of said common modulating signal and feeding the same to a utilization device.

References Cited

UNITED STATES PATENTS

| | | | |
|---|---|---|---|
| 1,766,050 | 6/1930 | Young | 325—154 X |
| 1,816,579 | 7/1931 | Hammond | 325—56 X |
| 1,861,462 | 6/1932 | Trouant | 325—154 X |
| 2,420,868 | 5/1947 | Crosby | 325—56 X |
| 2,545,511 | 3/1951 | Brinkley | 325—58 X |
| 2,610,292 | 9/1952 | Bond et al. | 325—304 X |
| 2,725,467 | 11/1955 | Atwood | 325—304 |

JOHN W. CALDWELL, *Primary Examiner.*